United States Patent [19]

Meibuhr

[11] Patent Number: 4,505,628
[45] Date of Patent: Mar. 19, 1985

[54] BEARING LOCKNUT

[76] Inventor: George C. Meibuhr, 8325 Midland Rd., Mentor, Ohio 44060

[21] Appl. No.: 420,833

[22] Filed: Sep. 21, 1982

Related U.S. Application Data

[60] Continuation-in-part of Ser. No. 241,522, Mar. 9, 1981, abandoned, which is a continuation-in-part of Ser. No. 054,156, Jul. 2, 1979, abandoned, which is a division of Ser. No. 915,867, Jun. 15, 1978, abandoned.

[51] Int. Cl.³ .................. F16B 39/02; F16B 39/00
[52] U.S. Cl. ................... 411/123; 411/190; 411/217; 411/315
[58] Field of Search ............ 411/123, 190, 398, 209, 411/217, 221, 222, 313, 315, 393, 537, 538; 308/234, 244

[56] References Cited

U.S. PATENT DOCUMENTS

| | | | |
|---|---|---|---|
| 578,412 | 3/1897 | Lunsford | 411/315 |
| 838,917 | 12/1906 | Treadwell | 411/222 |
| 1,061,125 | 5/1913 | Reighard | 411/315 |
| 1,211,553 | 1/1917 | Dervoz | 411/217 |
| 1,345,358 | 7/1920 | Fuller | 411/537 |
| 2,168,469 | 8/1939 | Brouwer | 308/236 |
| 3,082,048 | 3/1963 | Jordan et al. | 308/236 |
| 3,220,289 | 11/1965 | Farekas | 411/537 X |
| 4,042,306 | 8/1977 | Murray | 411/315 X |

FOREIGN PATENT DOCUMENTS

| | | | |
|---|---|---|---|
| 465060 | 9/1928 | Fed. Rep. of Germany | 411/190 |
| 371454 | 5/1939 | Italy | 411/315 |
| 3534 | of 1894 | United Kingdom | 411/538 |
| 156077 | 5/1921 | United Kingdom | 411/190 |
| 866836 | 5/1961 | United Kingdom | 384/537 |
| 666313 | 6/1979 | U.S.S.R. | 411/537 |

Primary Examiner—Thomas J. Holko
Assistant Examiner—Rodney Lindsey
Attorney, Agent, or Firm—Woodling, Krost, Rust & Hochberg

[57] ABSTRACT

A bearing lockout assembly having a locking cup piece which maintains locking keys in retentive association in counterbores of a lockout is disclosed. The locking cup piece is keyed on its inner diameter to a shaft and provided on the edge of its outer diameter with means to coact with the locking keys to define a vernier self locking feature.

8 Claims, 34 Drawing Figures

BEARING LOCKNUT

This application is a continuation-in-part application of U.S. patent application Ser. No. 241,522 filed Mar. 9, 1981, and entitled "Bearing Locknut", which was a continuation-in-part of Ser. No. 54,156 filed July 2, 1979, which was a division of Ser. No. 915,867, filed June 15, 1978, all having the same title now all abandoned.

The present invention relates in general to arrangements used to retain precision ball or roller bearings on a shaft, and more particularly to the nut, commonly called a bearing locknut, and the lockwasher which prevents unscrewing of the locknut when assembled. Both of these elements are standardized over a wide range of sizes conforming to standard bearing dimensions and are commonly used to retain the inner race of a ball or roller bearing, but may be, and are, used to retain elements other than bearings if desired.

It is the object of the present invention to eliminate or correct these inaccuracies by offering a perfectly true and square face on the bearing locknut.

Another object of the present invention is to provide a bearing locknut assembly which offers a perfectly true and square thrust face, and in addition eliminates the need of the conventional lockwasher by incorporating an improved method of locking within the body of the locknut.

It is an object of the invention to eliminate loose pieces; all the parts are contained within the locking assembly.

It is an object of the invention to provide for a locking action without altering the balance of the assembly.

Other objects and a fuller understanding of this invention may be had by referring to the following description and claims, taken in conjunction with the accompanying drawings, in which:

Figures 1, 2, 3:
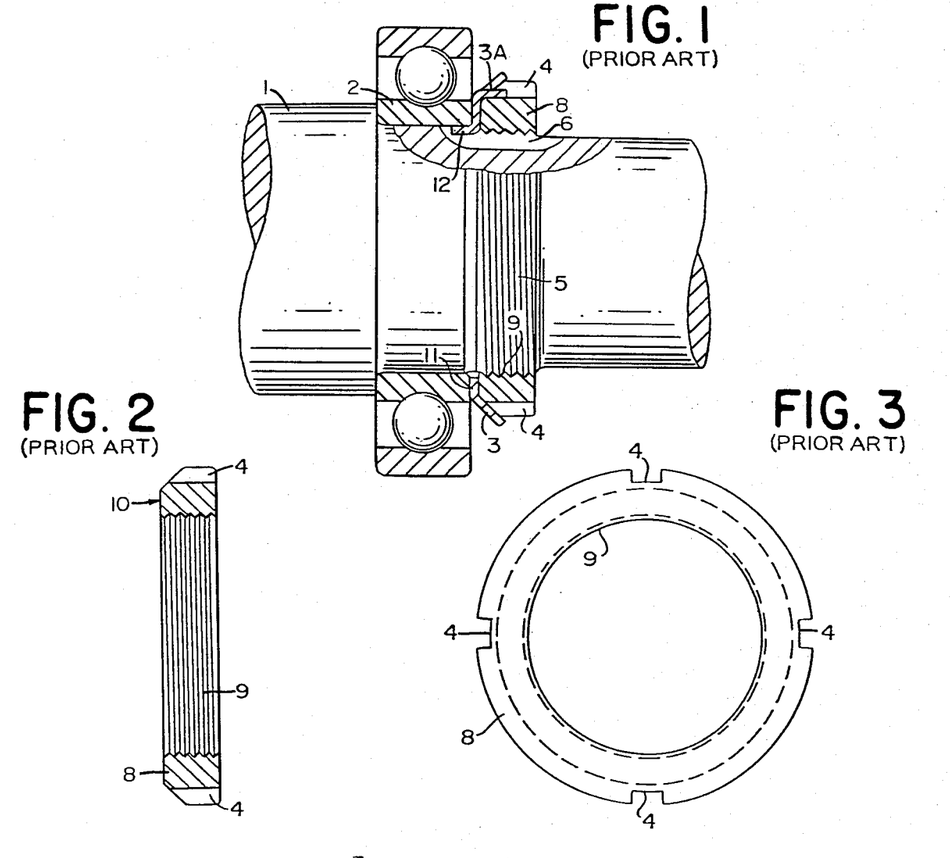
FIG. 1 is an elevational view of a bearing locknut, lockwasher and bearing assembly of the prior art.
FIG. 2 is a sectional view through the bearing locknut shown in FIG. 1.
FIG. 3 is a rear view of the bearing locknut shown in FIG. 2.

The prior art locknut 8 shown in FIGS. 1, 2 and 3 is arranged with the internal threads 9 matching the external threads 5 on the shaft 1. The locknut is provided with a multiplicity of equally spaced slots 4 in the periphery which are arranged to receive one of the plurality of lockwasher tangs 3 at assembly. The slots 4 in the nut 8 also serve as spanner wrench slots for tightening.

Figure 4:
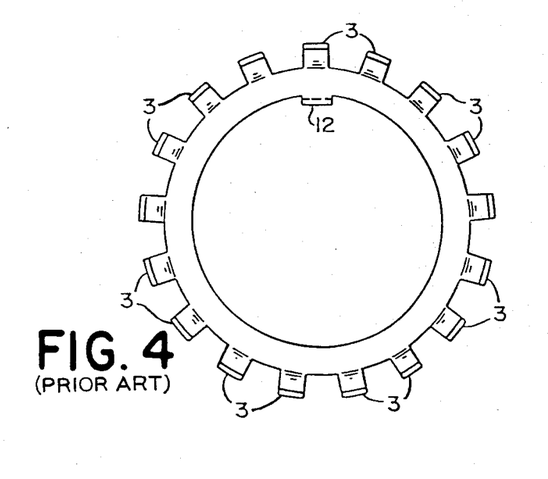
FIG. 4 is a rear view of the lockwasher shown in FIGS. 1 and 5.
Figure 5:
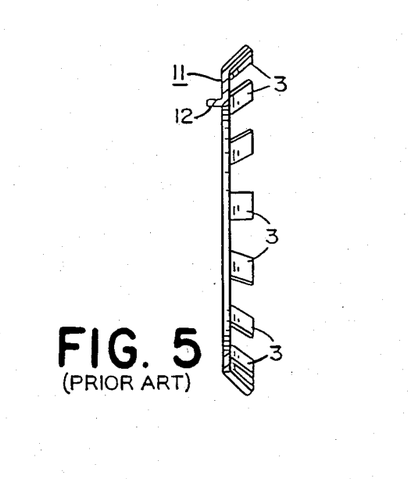
FIG. 5 is a sectional view of the lockwasher of the prior art and shown in FIG. 1.

The lockwasher 11 shown in FIGS. 1, 4 and 5 is arranged with an odd number of equally spaced tangs 3 arranged to mate with a slot 4 in the locknut. An internal key 12 on the lockwasher 11 is inserted into keyway 6 in the shaft 1 and prohibits rotation of the lockwasher 11 relative to the shaft and when finally assembled, also prevents rotation of the nut relative to the shaft.

Assembly view FIG. 1 shows the nut 8 threaded on the external threads 5 of the shaft. The lockwasher 11 is interposed between the nut and the bearing inner race 2. After tightening the nut, tang 3A in the lockwasher which is aligned with a slot 4 is bent downward into the slot 4 in the locknut, completing the assembly.

Inherent in the present design and manufacture of the bearing locknut is the accumulation of tolerances between the external threads 5 of the shaft, the internal threads 9 of the nut 8 and the thrust face 10 of the nut 8. This accumulation of errors results in a face 10 which may be out of parallel with the face of the bearing inner race 2. Present standards allow up to 0.006 inch total indicator reading for this tolerance.

This accumulated out of parallel tolerance, commonly called bearing locknut face-runout, may, when the locknut is tightened against the bearing inner race 2, result in a distortion of the bearing inner race which may lead to bearing malfunction and reduced bearing life.

Another factor contributing to a distortion of the bearing inner race in the prior art method of assembly is the bending of the tang 3A of the lockwasher 11 into slot 4 of the nut as shown in FIG. 1. This bending may result in a deformation of the face of the lockwasher which in turn is transmitted to the bearing inner race 2.

The invention of this application provides a positive self-locking bearing locknut while eliminating the problem of face runout tolerances and deformations. The bearing locknut locks without causing any strain due to deformation of the face of the bearing. The bearing locknut provides for a vernier locking adjustment, and does so with self-locking screws.

The present invention has to do with an improved and more accurate bearing locknut which eliminates the inaccuracies inherent in the present standard bearing locknut. The present invention includes three embodiments.

The first embodiment, that of FIGS. 9 through 14, includes a body, keyed locking plate, spherical thrust washer and a locking screw that is parallel to the axis of the main shaft.

The body of the nut is threaded on the inside diameter to mate with the threads on the shaft, and counterbored to receive and contain the keyed locking plate and the spherical washer. The body is knurled on the outer circumference to facilitate manual run on, and incorporates spanner holes, radially located on the outer circumference, for final wrench tightening and adjustment. The rear of the body is tapped in a multiplicity of places to accept a locking screw, with the locking screw centerline being approximately parallel to the centerline axis of the shaft.

The second embodiment, that of FIGS. 15 through 23, includes body, keyed locking plate, spherical thrust washer and a locking screw that is perpendicular to the axis of the main shaft.

Figure 15:
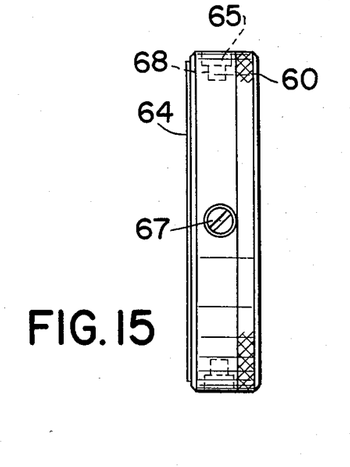
FIG. 15 is a side elevational view of the second embodiment of the present invention.
Figure 16:
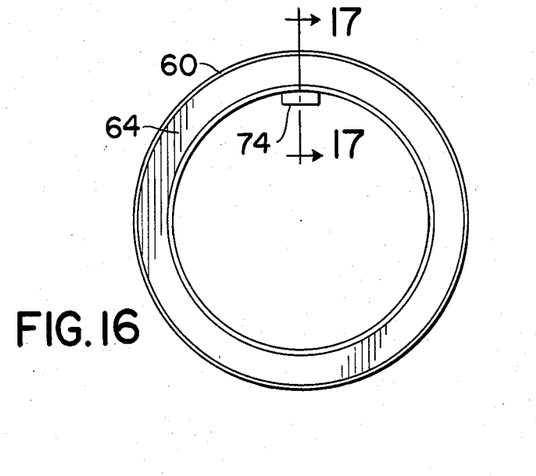
FIG. 16 is a view taken from the left side of FIG. 15.
Figure 17:
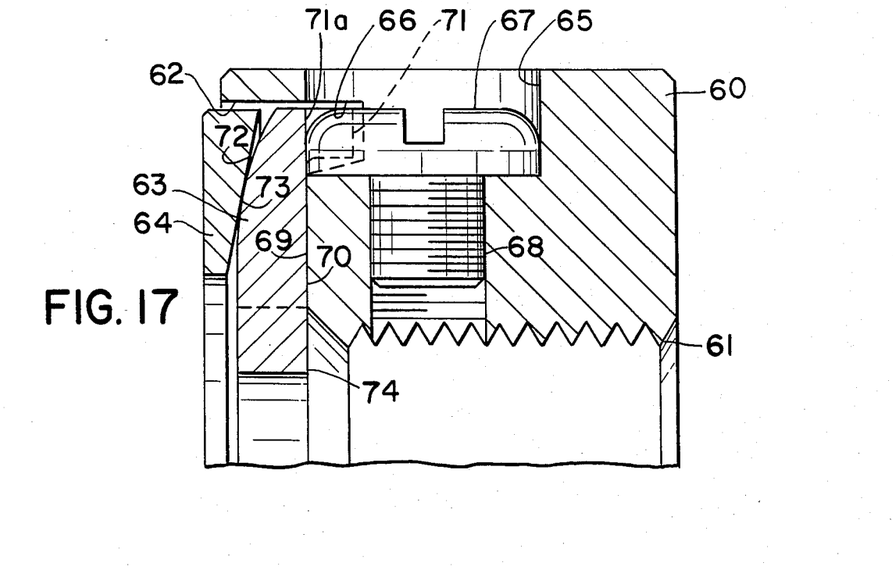
FIG. 17 is a view taken generally along the line 17—17 of FIG. 16.
Figure 18:
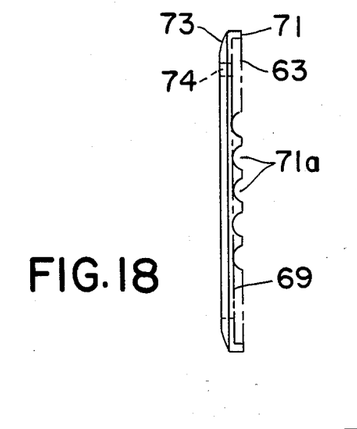
FIG. 18 is a side view of the keyed lock plate.
Figure 19:
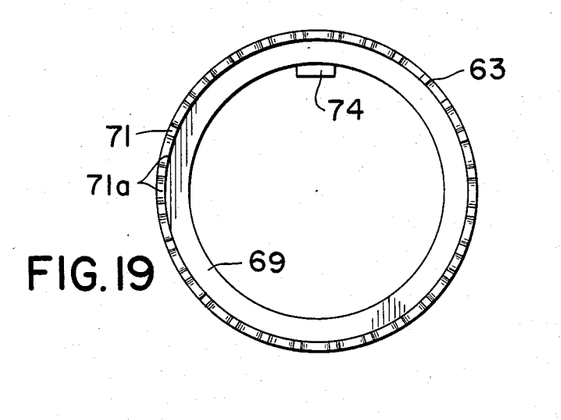
FIG. 19 is a view taken from the right side of FIG. 18.

The body of the nut is threaded on the inside diameter to mate with the threads on shaft 1, and counterbored to receive and contain the keyed locking plate and spherical washer. The body is knurled on the outer circumference to facilitate manual run on and incorporates spanner holes, radially located on the outer circumference, for final wrench tightening and adjustment.

A trepanned groove, extending from the counterbore inner face, and protruding into the spanner holes provides a means for the rim of the locking plate to extend into the spanner holes. The locking screw is assembled into the spanner hole to mate with the notch, or scallop, in the rim of the locking plate to lock the nut to the locking plate and to the shaft, with the locking screw centerline being approximately perpendicular to the centerline axis of the shaft.

When either embodiment is finally assembled on the shaft, with the thrust washer tight against the bearing inner race and with the key engaged into the shaft keyway and with the locking screw engaging into the locking plate, the assembly is made fixed against movement in either direction.

Figures 20, 21:
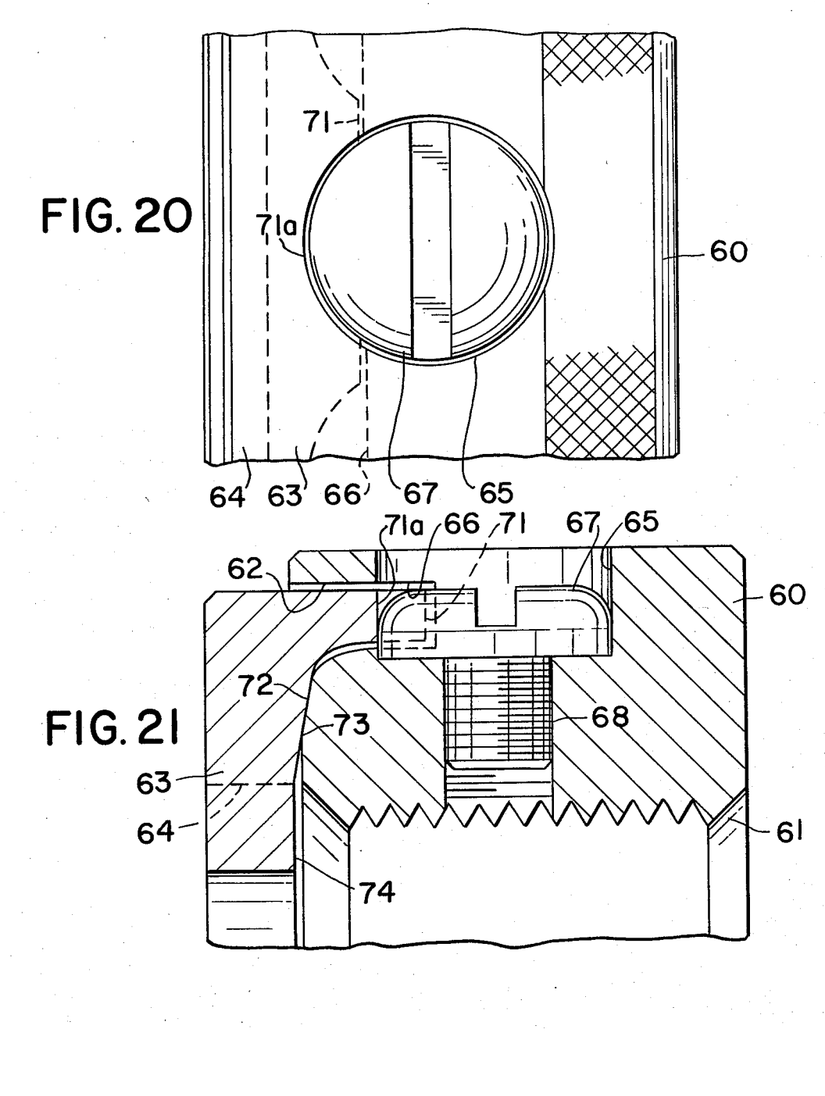
FIG. 20 is a top view of FIG. 17.
FIG. 21 is a view of an alternate two piece design of the invention of this application (as shown in the second embodiment).
Figure 22:
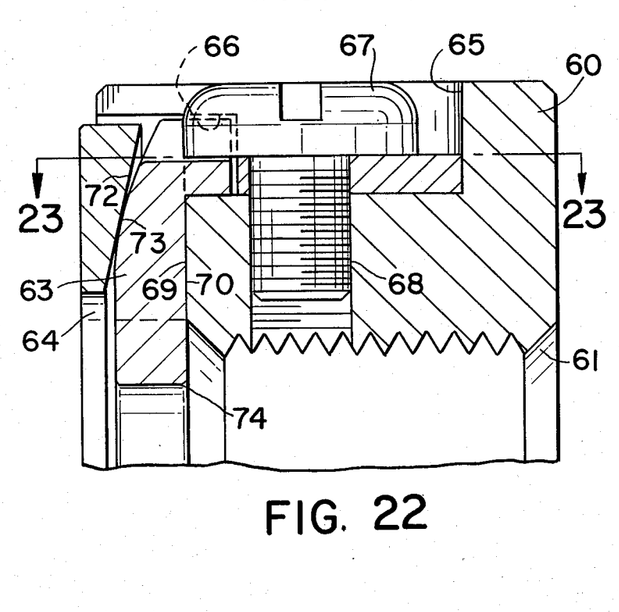
FIG. 22 is another alternative design to FIG. 17.
Figure 23:
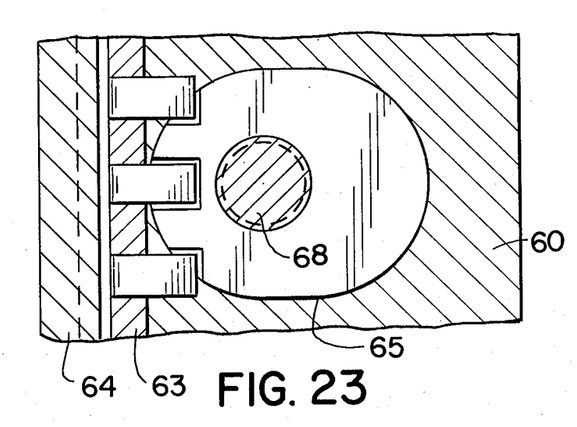
FIG. 23 is a top view of FIG. 22 disclosing the lock plate used in that design.

As shown in FIG. 21 in either embodiment the functions of the locking plate and spherical washer may be combined into one adjustment means.

Figures 6, 7:
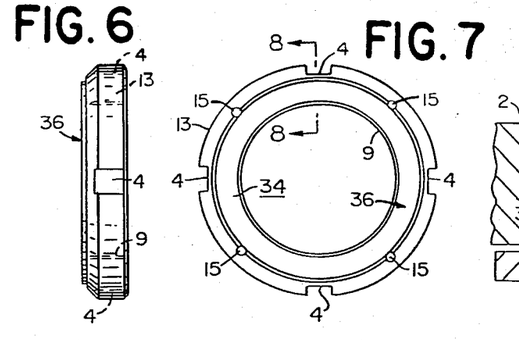
FIG. 6 is a side elevational view of the bearing locknut of the present application.
FIG. 7 is a view taken from the left side of FIG. 6.
Figure 8:
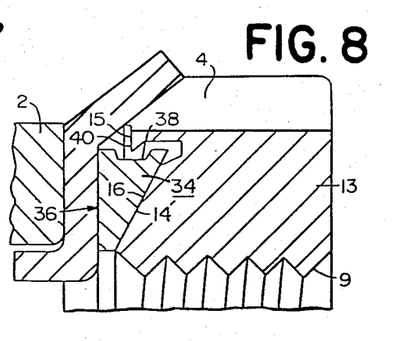
FIG. 8 is an enlarged sectional view taken along the line 8—8 of FIG. 7.

The embodiments incorporate a spherical washer thrust face which swivels under load to conform to the face presented by the bearing inner race and also a means of retaining the spherical washer thrust face in the bearing locknut body. In these figures and in the use of the structure of these figures where the structure is the same as in FIGS. 1-5, the same reference numbers are used. FIGS. 6, 7 and 8 illustrate this type of bearing locknut. As previously noted, the outer configuration of this design conforms to the present standard locknut.

Incorporated into the assembly is an inserted thrust washer 34 set loosely into the locknut body as shown. The thrust washer has a spherical thrust face 14 which is formed as a segment of a spherical surface. The washer 34 also has a bearing engaging face 36 opposite surface 14 which is planar in nature. A mating spherical surface 16 is provided in the body of locknut 13.

Thrust washer 34 has an annular groove 38 in its outer diameter. When assembled with the nut 13, it is staked at several places 15, and a bit of metal 40 is displaced into this groove at several places, serving to loosely contain the assembly without reducing the compensating swivel between the spherical faces 14 and 16.

This design of the present invention assembles to the shaft exactly as shown in FIG. 1 and uses the conventional lockwasher 11 as best seen in FIG. 8.

The first embodiment of the invention of this application is shown in FIGS. 9 through 14.

The locknut 17 shown in FIGS. 9-12 is threaded 9 on the inside diameter and counterbored 42 to receive a keyed locking plate 20 and an inserted spherical thrust washer 45. The periphery of the locknut is knurled as shown to facilitate manual running on of the nut on the shaft 1. Spanner holes 21 are provided for final wrench tightening. Several tapped holes 25 are arranged to receive a standard dog point set screw 22.

The plate 20 has a flat surface 48 to engage the counterbore bottom 42 and has a thrust face 49 formed as a segment of a sphere. The washer 45 has a thrust face 51 also formed as a segment of a sphere and engaging face 49.

The keyed locking plate 20 is fitted snugly into the counterbore 42 in the locknut 17, but allowed to rotate freely in the nut.

The thrust washer 45 is made of a slightly smaller diameter than the diameter of the locking plate 20 and the counterbore 42 to permit the thrust washer 45 to swivel freely by means of the engagement of the two spherical surfaces 49 and 51.

The face of the locknut 17 is staked several places indicated at 19 after the locking plate 20 and thrust washer 45 are assembled. This staking operation displaces a bit of metal 53 into the groove 54 in the thrust washer 45 as best shown in FIG. 12 and serves to contain the assembled components.

To assemble to the shaft, the locknut assembly of FIGS. 9-12 is advanced on the threads 5 of the shaft 1 shown in FIG. 1, with the internal key 56 of the lock plate engaged in the keyway 6 in the shaft 1. As the locknut is rotated to thread on, by its threads 9, the lock plate remains rotationally stationary. Final tightening against the bearing inner race 2 causes the thrust washer 45 to swivel by means of faces 49 and 51 and align its planar face 58 with the face of the bearing inner race 2.

Figures 9, 10, 11, 12, 13, 14:
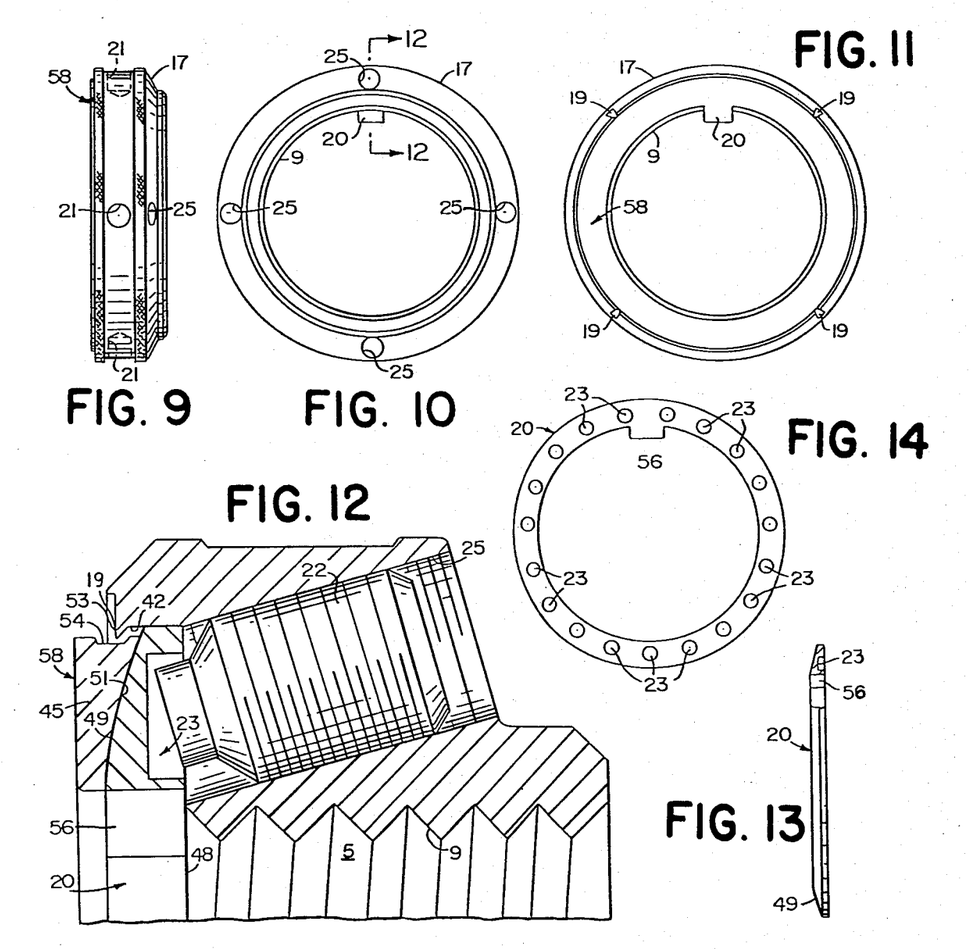
FIG. 9 is a side elevational view of the first embodiment of the bearing locknut of the present invention.
FIG. 10 is a view taken from the right side of FIG. 9.
FIG. 11 is a view taken from the left side of FIG. 9.
FIG. 12 is a view taken generally along the line 12—12 of FIG. 10.
FIG. 13 is an elevational view of the keyed lock plate.
FIG. 14 is a view taken from the right side of FIG. 13.

To effect the final assembled position, one of the holes 25 in the locknut is brought into rotational alignment with one of the holes 23 in the locking plate 20, see FIG. 12. A dog point set screw 22 is inserted and screwed in until the dog point enters the aligned hole 23 in the locking plate 20 and prevents further rotation of the locknut. Screw 22 is equipped with a nylon plug or patch for resisting rotation.

To provide a vernier adjustment, the holes 23 in the lock plate are an uneven number and holes 25 in the locknut are an even number. The opposite disposition of these holes may be used with equal effect.

The second embodiment of the present invention is shown in FIGS. 15 through 23.

This embodiment includes the advantages of the invention of this application in a smaller package. This smaller package is due, in great part, to the reorientation of the locking screw from roughly parallel to the main shaft to perpendicular to the main shaft. This allows the bearing locknut to be of smaller length and diameter. This reorientation removes any possibility of distortion of the locknut-bearing surface due to inadvertent over-tightening of the locking screw; the tightening of the locking screw is self-limited. The reorientation also greatly reduces the clearance needed to lock the bearing locknut in place; the locknut can be affixed in its own length. The spanner holes and screw access holes are coextensive in the embodiment disclosed. This reduces the machining operations necessary to construct the locknut.

The locknut 60 shown in FIGS. 15 through 23 is threaded 61 on the inside diameter and counterbored 62 to accept and contain keyed locking plate 63 and spherical thrust washer 64. The periphery of the locknut is knurled to facilitate manual running on of the nut on shaft 1. Spanner holes 65 are provided for final wrench tightening and adjustment. A trepanned groove 66 protrudes from counterbore 62 into the spanner holes 65 in such a way as to permit the tangs in the rim of the locking plate to extend into the spanner holes when assembled. Screw 67 is inserted into the spanner hole and threaded into tapped hole 68, engaging the scallop, or cutout, in the rim of the locking plate to complete the assembly. At this point the nut body is locked to the locking plate, which is keyed to the shaft, and the entire assembly is restricted from further movement in either direction.

The locking plate 63 is fitted snugly into the counterbore 62 in the locknut 60, but is allowed to rotate freely in that member. The locking plate 63 has a flat surface 69 to engage the counterbore bottom face 70, a rim 71 which is contoured 71a to adapt to the configuration of the trepanned groove 66 and has a thrust face 73 formed as a segment of a sphere.

Washer 64 has a thrust face 72 formed as a segment of a sphere for engaging face 73 of the locking plate 63. Thrust washer 64 is made of a slightly smaller diameter than the diameter of the locking plate 63 and counterbore 62 to permit the thrust washer to swivel freely when assembled so as to align its planar face with the face of the inner face of the bearing that it is retaining.

To assemble to the shaft, the locknut assembly of FIGS. 15 through 22 is advanced on threads 5 of shaft 1 shown in FIG. 1, with the internal key 74 of the lock plate engaged in keyway 6 in shaft 1. As the locknut 60 is rotated to thread on its internal threads 61, the locking plate 63 remains rotationally stationary. Final tightening against the bearing inner race 2 causes thrust washer 64 to swivel by means of faces 72 and 73 to align its planar face with the face of the bearing inner race 2.

To effect the final assembled position one of the spanner holes 65 is brought into rotational alignment with one of the contours 71a on the rim 71 of the locking plate 63 in such a manner that screw 67 can be inserted into the spanner hole, with the head of screw 67 mating with the contoured portion 71a of the locking plate rim 71, preventing further motion of the nut body in either direction. Screw 67 is provided with a nylon plug or patch or coating to prevent unscrewing.

To provide a vernier adjustment, contours 71a in the locking plate rim 71 are made an uneven number, and spanner holes 65 in the locknut 60 are made an even number. The opposite disposition of these holes may be made with equal effect.

It should be understood that various configurations of the locking plate rim 71 and the engaging member can be incorporated without departing from the spirit of the invention. It is also apparent to one reasonably skilled in the art that the spherical surface of the thrust washer may be made conical (or angular) without departing from the spirit of the invention.

The third embodiment of the present invention is shown in FIGS. 24–34.

Figure 31:
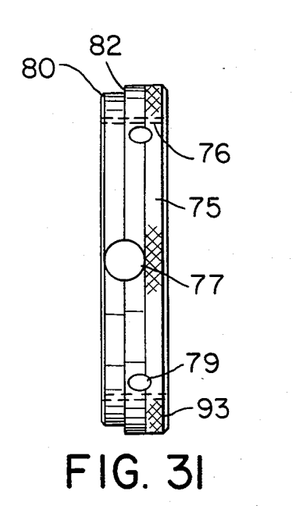
FIG. 31 is a side view of the locknut body of FIG. 24.
Figure 32:
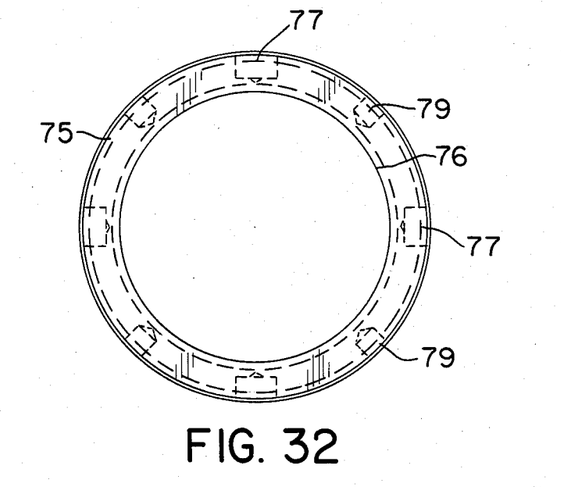
FIG. 32 is a front view of the locknut body of FIG. 31.
Figure 33:
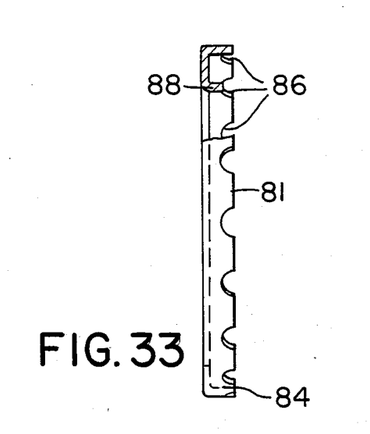
FIG. 33 is a side view of the locking cup piece of FIG. 24.
Figure 34:
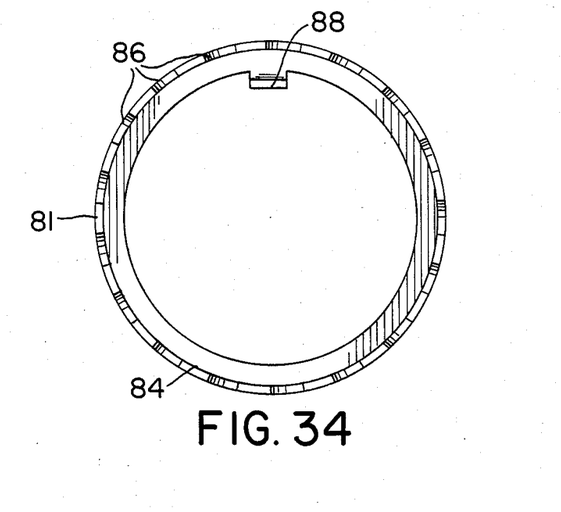
FIG. 34 is a front view of the locking cup piece of FIG. 33.

The locknut body 75 is threaded 76 on its inside diameter to mate with the threads of shaft 1, FIG. 1. An equal number of counterbores 77 are located radially in the outer circumference and arranged to contain keys 78. Spanner holes 79 are located radially in the outer circumference and spaced equally between counterbores 77, as shown in FIGS. 31, 32.

Pilot diameter 80 is turned on the outer surface of body 75 on the forward end, the diameter being so dimensioned as to accept freely the inside diameter of locking cup piece 81. Face 82 is located slightly beyond the centerline locating counterbores 77, measured from thrust face 83.

The body is knurled 93 (see FIGS. 26, 31) to facilitate manual run on. A spanner wrench inserted into spanner holes 79 (see FIGS. 31, 32) is used for final tightening and adjustment.

Figure 24:
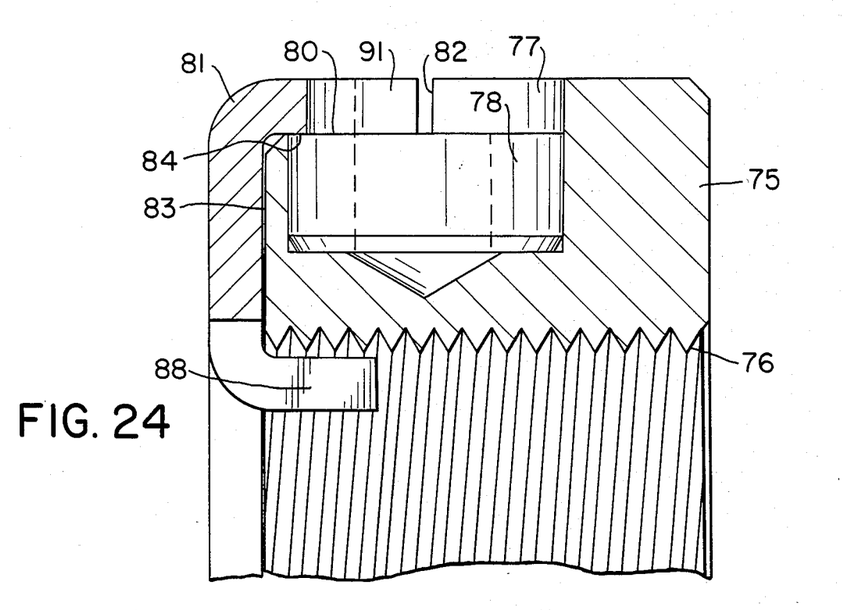
FIG. 24 is a cutaway side view of a third contained locking key embodiment of my invention. This figure is shown in a locked position.
Figure 25:
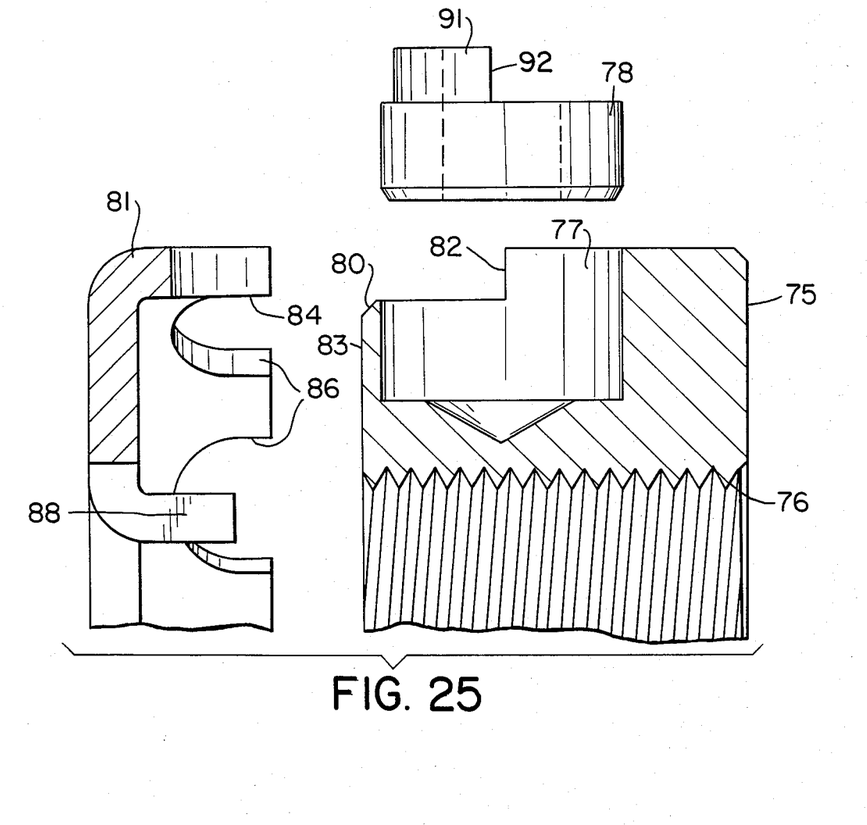
FIG. 25 is an expanded view of the locking key assembly of FIG. 24.

Locking cup piece 81 (FIGS. 33, 34) is arranged with its inside diameter 84 to fit snugly, but rotate freely on pilot diameter 80 of body 75, (FIG. 24). The skirt of cup piece 81 is arranged with an uneven number of cutouts 86 equally spaced around the circumference. Radius of cutouts 86 is designed to be slightly larger than radius 90 of the pilot diameter 91 of keys 78 (see FIG. 30) so as to allow key 78 to be rotated into engagement with any of the cutouts 86 to complete the assembly (FIG. 25).

Key 88 is arranged to engage keyway 6 in shaft 1, FIG. 1, to prohibit rotation of cup piece 81 on shaft 1 when assembled.

Keys 78 are designed to fit tightly into counterbores 77 in body 75 (see FIGS. 24, 26-28). The keys are slotted through on one side 89 and the inside diameter is arranged with a hexagonal shape 92 to accept a standard hex wrench (see FIGS. 29, 30). The outer diameter is expanded slightly to provide a firm grip to diameter 77 of body 75 so that the key retains its position when assembled.

Figure 28:
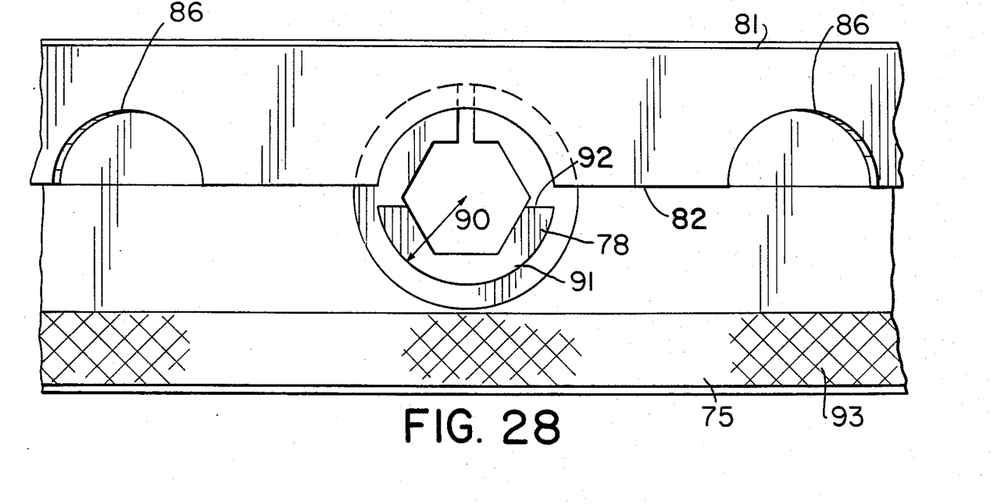
FIG. 28 is a top view of the locking key embodiment of FIG. 24 in a disengaged position.
Figure 29:
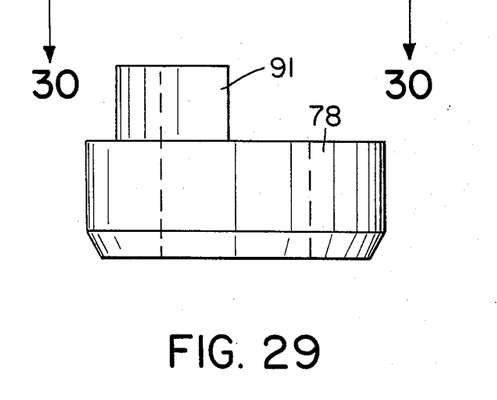
FIG. 29 is an enlarged side view of the locking key of FIG. 24.
Figure 30:
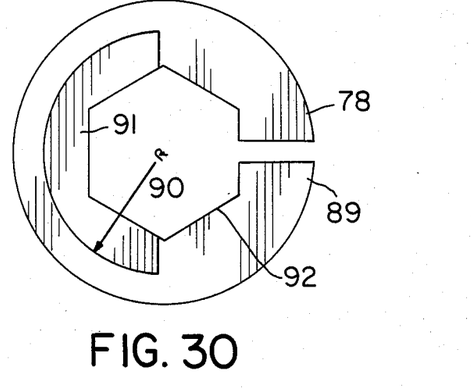
FIG. 30 is a top view of the locking key of FIG. 29 taken generally from lines 30—30 in that figure.

The keys 78 (4 in the embodiment shown) are assembled into each of the counterbores 77 and oriented into an unlocked position with face 92 aligned parallel to face 82 of body 75 (see FIG. 28).

To assemble to the shaft, the locknut assembly of FIGS. 24–34 is advanced into threads 5 of shaft 1 shown in FIG. 1, with the internal key 88 of the locking cup piece engaged in keyway 6 of shaft 1. As the locknut body 75 is rotated to thread on its internal threads 76, the locking cup piece remains rotationally stationary. Final tightening and adjustment is done by means of a spanner wrench inserted into spanner holes 79.

Figure 26:
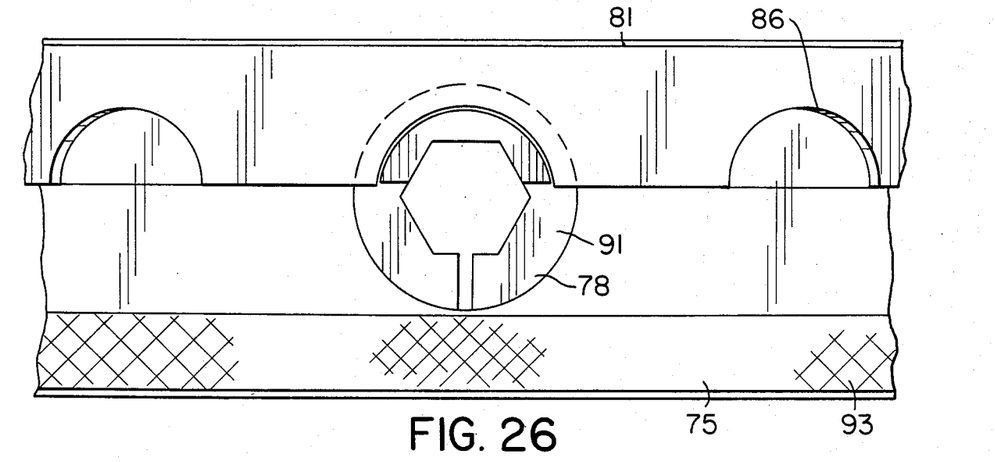
FIG. 26 is a top view of the locking cup embodiment of FIG. 24.
Figure 27:
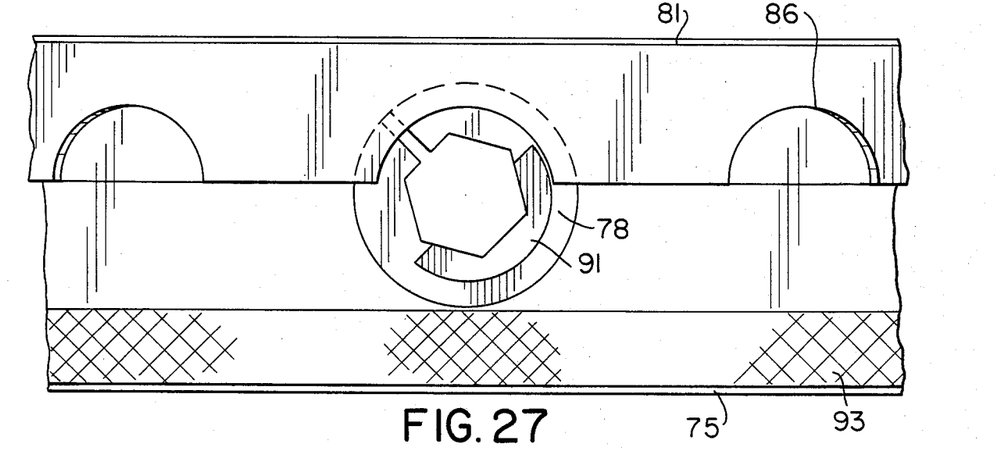
FIG. 27 is a top view of the locking key embodiment of FIG. 24 in a partially engaged position.

To effect the final assembled position, one of the keys 78 is brought into alignment with cutout 86 in locking cup piece 81. At this point that key 78 is rotated by inserting a hexagonal wrench into the hexagonal inside diameter of the key and turning the key one half turn so that the pilot diameter 91 is rotated into the pocket formed by radius 87, as shown in FIG. 26. At this point further rotation of the locknut in either direction relative to the shaft 1 is prevented.

To provide a vernier adjustment, contours 86 are made an uneven number, and counterbores 77 are made an even number. The opposite disposition of these holes may be made with equal effect.

It will be appreciated that the present invention provides: First, a bearing locknut which may be locked to the shaft without the insertion of a loose member, such as a screw, to complete the locking.

Second, the present invention provides a bearing locknut which may be locked to the shaft without deforming one of its members by an outside force, such as is required in the prior art where tab 3A of lockwasher 3 is bent into slot 4 of body 8. The present invention also eliminates the distortion of the thrust face which is inherent in the prior art.

Third, the present invention provides a bearing locknut which may be locked to the shaft without disturbing the balance of the assembly, as would be the case in FIG. 1 of the prior art.

Fourth, the present invention provides a bearing locknut which may be locked to the shaft without a change in the moment of inertia of the assembly.

Fifth, the present invention provides a means of locking a bearing locknut to the shaft which is contained within the locknut itself and which may be performed without special tools.

Sixth, the present invention offers a bearing locknut which is substantially smaller in diameter than the locknut prior art. FIGS. 1 and 2 of the prior art show that the diameter of face 10, which abuts to lockwasher 3 is as large as the locknut needs to be. Any material outside this diameter is not required to perform the task of retaining the bearing, being there only to provide a means of locking.

Conversely, the present invention provides a bearing locknut with full locking capabilities, which is essentially equal in diameter to the diameter of face 10, FIG. 2.

It will be appreciated that the present invention provides a reliable means of eliminating the face runout of the bearing locknut and the resulting distortion of the bearing inner race by offering a bearing locknut assembly which eliminates this error and provides a face which will align itself to the plane of the face of the bearing inner race.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A locknut assembly for a locknut with a threaded internal bore for retaining a bearing on a shaft having a threaded external diameter and a longitudinal axis, the locknut assembly comprising a locking cup piece, means for preventing the rotation of said locking cup piece in respect to the shaft, a non-360° cutout, said cutout being in one of the locknut or said locking cup piece, a rotary locking key, said rotary locking key having an axis of rotation, means to non-removably rotatably attach said rotary locking key to the other of the locknut or said locking cup piece with the axis of rotation of said rotary locking key being substantially perpendicular to and substantially intersecting the longitudinal axis of the shaft, and said rotary locking key being rotatable between a position of engagement with said cutout and a position of non-engagement with said cutout with said position of engagement of said locking key with said cutout preventing the rotation of the locknut in respect to the shaft and said position of non-engagement of said locking key with said cutout allowing the rotation of the locknut in respect to the shaft.

2. The locknut of claim 1 characterized in that said edge of said locknut has more than one cutout and in that the locknut has more than one hole with a locking key fitted thereinto with at least one of said multiple locking keys selectively engagable with at least one of said cutouts for preventing the rotation of the locknut.

3. The locknut assembly of claim 1 characterized in that there are a number of non-360° cutouts and a number of rotary locking keys with the number of said cutouts being different than the number of said rotary locking keys.

4. A locknut assembly for a locknut with a threaded internal bore for retaining a bearing on a shaft having a threaded external diameter and a slot, the locknut assembly comprising a locking cup piece, said locking cup piece having a face, a key and an edge, said face of said locking cup piece being generally planar for facing the bearing, said key for engaging the slot in the shaft for preventing rotation of said cup piece, said edge of said locking cup piece having a non-360° cutout therein, said edge of said locking cup piece overlapping part of the locknut, the locknut having a hole, a round locking key, said locking key non-removably fitted into said hole for rotation therein, and said locking key being selectively engagable with said cutout in said edge of said locking cup by rotation of said locking key in said hole of the locknut, the engagement of said locking key with said cutout of said edge of said locking cup piece preventing the rotation of the locknut and the non-engagement of said locking key with said cutout of said edge of sid locking cup piece allowing the rotation of the locknut.

5. The locknut assembly of claim 4 characterized in that the shaft has a longitudinal axis and in that the axis of rotation of said locking key is substantially perpendicular to and substantially intersects the longitudinal axis of the shaft.

6. A locknut assembly for a locknut with a threaded internal bore for restraining a bearing on a shaft having a threaded external diameter and a slot, the locknut assembly comprising a locking cup piece, said locking cup piece having a face, a key and an edge, said face of said locking cup piece being generally planar for facing the bearing, said key for engaging the slot in the shaft for preventing the rotation of said locking cup piece, the edge of said locking cup piece having a number of spaced non-360° cutouts therein, said edge of said locking cup piece overlapping part of the locknut, the locknut having a number of spaced holes therein, the spacing of the number of spaced holes in the locknut being different than the spacing of the number of spaced non-360° cutouts in said locking cup piece, a number of round locking keys, the number of said round locking keys being equal to the number of spaced holes in the locknut, said round locking keys being respectively non-removably fitted into said holes for rotation therein, and at least one of said round locking keys being selectably engageable with one of said cutouts in the edge of said locking cup piece by rotation of said one locking key in its respective hole in the locknut, the engagement of said one of said locking keys with one of said cutouts in said edge of said locking cup piece preventing the rotation of the locknut and the non-engagement of said one of said locking keys with said one of said cutouts in said edge of said locking cup piece allowing rotation of the locknut.

7. A locknut assembly for a locknut with a threaded internal bore for restraining a bearing on a shaft having a threaded external diameter, and a longitudinal axis, a slot, the locknut assembly comprising a locking cup piece, said locking cup piece having a face, a key and an edge, said face of said locking cup piece being generally planar for facing the bearing, said key for engaging the slot in the shaft for preventing the rotation of said locking cup piece, the edge of said locking cup piece having a number of spaced non-360° cutouts therein, said edge of said locking cup piece over-lapping part of the locknut, the locknut having a number of spaced holes therein, the spacing of the number of spaced holes in the locknut being different than the spacing of the number of spaced non-360° cutouts in said locking cup piece, a number of round locking keys, the number of said round locking keys being equal to the number of spaced holes in the locknut, said round locking keys being respectively non-removably fitted into said holes for rotation therein with the axis of rotation of said round locking keys being substantially perpendicular to and substantially intersecting the longitudinal axis of the shaft, and at least one of said round locking keys being selectably engageable with one of said cutouts in the edge of said locking cup piece by rotation of said one locking key in its respective hole in the locknut, the engagement of said one of said locking keys with said one of said cutouts in said edge of said locking cup piece preventing the rotation of the locknut and the non-engagement of said one of said locking keys with said one of said cutouts in said edge of said locking cup piece allowing rotation of the locknut.

8. A locknut assembly for a locknut with a threaded internal bore for restraining a bearing on a shaft having a threaded external diameter, and a longitudinal axis, a slot, the locknut assembly comprising a locking cup piece, said locking cup piece having a face, a key and an edge, said face of said locking cup piece being generally planar for facing the bearing, said key for engaging the slot in the shaft fo preventing the rotation of said locking cup piece, the edge of said locking cup piece having a number of equally spaced non-360° cutouts therein, said edge of said locking cup piece overlapping part of the locknut, the locknut having a number of equally spaced holes therein, the spacing of the number of equally spaced holes in the locknut being different than the spacing of the number of equally spaced non-360° cutouts in said locking cup piece, a number of round locking keys, one of said number of equally spaced non-360° cutouts or said number of equally spaced holes being odd in number and the other of said number of equally spaced non-360° cutouts or said number of equally spaced holes being even in number, the number of said round locking keys being equal to the number of equally spaced holes in the locknut, said round locking keys being respectively non-removably fitted into said holes for rotation therein with the axis of rotation of said round locking keys being substantially perpendicular to and substantially intersecting the longitudinal axis of the shaft, and at least one of said round locking keys being selectably engageable with one of said cutouts in the edge of said locking cup piece by rotation of said one locking key in its respective hole in the locknut, the engagement of said one of said locking keys with said one of said cutouts in said edge of said locking cup piece preventing the rotation of the locknut and the non-engagement of said one of said locking keys with said one of said cutouts in said edge of said locking cup piece allowing rotation of the locknut.

* * * * *